United States Patent Office 3,776,978
Patented Dec. 4, 1973

3,776,978
EPOXY RESINS CONTAINING PHENOLIC ACCELERATORS AND ORGANIC TITANATES
Mark Markovitz, 2173 Apple Tree Lane,
Schenectady, N.Y. 12309
No Drawing. Continuation-in-part of abandoned application Ser. No. 69,481, Sept. 3, 1970. This application Jan. 7, 1972, Ser. No. 216,240
Int. Cl. C08g 45/08
U.S. Cl. 260—831
24 Claims

ABSTRACT OF THE DISCLOSURE

The cure rate of epoxy resins containing 1,2 epoxy groups and having more than one epoxide group per molecule can be controllably varied by the utilization of a hardener comprising a mixture of a phenol and an organic titanate containing only titanium-oxygen primary valence bonds wherein the phenol is present in quantities less than 15% by weight of the epoxy resin, and the organic titanate is present in quantities less than 10% by weight of the epoxy resin.

---

This application is a continuation-in-part application of my U.S. patent application Ser. No. 69,481, filed Sept. 3, 1970, now abandoned.

This invention relates to novel electrical insulating polymeric materials and in particular, to a thermosetting epoxy resin insulation having a long shelf life and a gelation speed which can be varied over a broad interval by an alteration of either the composition or weight percentage of the ingredients forming the insulation.

Epoxy resin insulations, such as epoxy resin cross-linked with carboxylic acid anhydrides, heretofore have been advantageously utilized as electrical insulation for electrical conductors forming the windings of dynamoelectric machine because of the superior insulating qualities and heat aging characteristics of these epoxy resins. The cure rate of the epoxy resins, however, previously has been of prolonged duration, e.g., often as long as fifteen to twenty hours at 160° C., significantly delaying fabrication of the machines. While faster curing epoxy resin insulations can be employed, e.g., mixtures of glycidyl ether epoxy resins with a polyamine or polyamide, the cured insulation often exhibits poor electrical characteristics at temperatures above 100° C. and/or poor heat aging properties. Moreover, the rate of cure of the epoxy resin insulations heretofore have been fixed by the chosen hardener and there was no ability to control the cure rate over a broad range dependent upon extraneous factors encountered during fabrication of the machine. The short pot life and pungent odors characteristic of many epoxy resin hardener solutions also make these materials difficult to employ on a sustained basis.

Halides of metals, e.g., titanium tetrachloride, aluminum chloride, aluminum bromide, zinc chloride, boron trifluoride, silicon tetrachloride, stannic chloride and ferric chloride, heretofore have been used as epoxy curing agents. The epoxy cure catalyzed by these metal halides, however, generally results in high exothermic reactions and these metal halides, therefore, normally are useful curing agents only for small masses, when working lives of approximately 30 seconds can be tolerated. It also is known that the halogens in compounds such as boron trifluoride, aluminum chloride, titanium chloride, aluminum bromide, ferric chloride and stannic chloride can be partially replaced with a chelating group without destroying the ability of the resultant halometallic chelates to cure epoxy resins, e.g., many metal chelate compounds in which the coordinating metal atom is bound by one or more of its primary valence bonds to a fluorine, chlorine or bromine atom are known to cause epoxy resins to gel within minutes at 80–100° C. While these chelates are effective hardeners without additional hardeners or accelerators, these chelates also have been suggested as being useful in conventional epoxy resin compositions, e.g., epoxy-acid anhydride and epoxy-polyamine compositions. Because the halogens in these chelates are labile, however, they can tend to introduce ionic species into the cured epoxy resin diminishing the effectiveness of the resin as an electrical insulation at temperatures in excess of 160° C.

Titanium has a valence of four (primary valence bonds) and a maximum coordination number of six (four primary valence bonds and two secondary valence bonds or chelate bonds). Titanium compounds heretofore suggested for curing epoxy resins typically contain one or more primary valence bonds to fluorine, chlorine or bromine such as is exhibited by the titanium chelate bis-(acetylacetonate)titanium dichloride having two titanium-chloride primary valence bonds. When the four primary valence bonds of titanium are titanium-oxygen bonds, the titanium compounds typically are not effective as epoxy resin hardeners. For example, titanium acetylacetonate, where all four titanium primary valence bonds are Ti—O bonds, will not produce gelation in an epoxy resin composition prepared by the reaction of (4,4'-dihydroxydiphenyl)dimethylmethane with epichlorohydrin even after seven (7) hours at 200° C., while bis(acetylacetonate) titanium dichloride is known to effectively gel similar epoxy resin compositions within approximately three (3) hours at 200° C.

Phenolic compounds or phenolic resins also are known to be useful as epoxy resin hardeners. The properties of the cured resins, however, generally are dependent on the functionality of the phenolic compound. For optimum properties, the phenolic compound normally should have a high functionality and the phenolic compound is used in stoichiometric or nearly stoichiometric quantities. Phenolic compounds containing one phenolic group, e.g., p-nitrophenol, salicylaldehyde, o-hydroxybenzyl alcohol, etc., normally will not cure epoxy resins no matter how much of the phenolic compound is used with the epoxy resin.

Surprisingly, we have found that epoxy resin-organic titanate compositions containing only Ti—O primary valence bonds can be quickly cured to phenolic compounds ful products when small quantities of phenolic compounds or phenolic resins are added. The phenolic compounds or phenolic resins normally are used in quantities, i.e., 0.1–15% by weight of the epoxy resin, which do not cure the epoxy resin in the absence of the organic titanate. While the phenolic content normally is well below stoichiometric quantities when used in accordance with this invention to cure epoxy resins, the phenolic content can fall within a stoichiometric range when utilized with solid epoxy resins having a high epoxide equivalent weight. The reactivity of epoxy-organic titanate-phenolic compositions and the properties of the cured resins therefore are not strongly dependent on the functionality of the phenolic material and tough, useful materials can be obtained even with monofunctional phenolics which do not cure epoxy resins.

While in most cases no useful product can be obtained with the epoxy-organic titanate or epoxy-phenolic compositions which are within the scope of this invention, fast reacting resins having useful properties are obtained with similar epoxy resin compositions containing both the organic titanate and the phenolic compound. For example, the epoxy-titanium acetylacetonate composition described above which did not gel even after seven (7) hours at 200° C., gelled within three (3) minutes at 200° C. when approximately 5% of catechol was included in the composition. Moreover, in those epoxy resin compounds containing organic titanates (having only Ti—O primary valence bonds which showed reactivity, the reaction rate was substantially accelerated by the addition of phenolic compounds or phenolic resins.

An additional difficulty heretofore encountered with epoxy resin materials is the inability of known hardening agents to cross-link all types of epoxy resins. For example, amines do not readily harden cycloaliphatic epoxy resins while reacting very rapidly with glycidyl ether epoxy resins. Thus, inventories of different epoxy hardening agents were required for utilization with the diverse epoxy resins desired for specialized insulation purposes.

It is therefore an object of this invention to provide novel epoxy resin insulating materials having variable cure rates dependent upon the concentration and/or choice of hardening agent employed with the epoxy resin.

It is also an object of this invention to provide an epoxy resin insulation characterized by a long shelf life and a rapid cure period at elevated temperatures.

It is a still further object of this invention to provide an epoxy resin insulation wherein a single hardening agent is employed to controllably cure diverse families of epoxy resins.

These and other objects of this invention generally are achieved by a thermosetting epoxy resin consisting essentially of a mixture of an epoxy resin containing 1,2 epoxy groups and more than one epoxy group per molecule, a phenolic accelerator in quantities between 0.1 and 15% by weight of the epoxy resin and an organic titanate containing only titanium-oxygen primary valence bonds in quantities between 0.05 and 10% by weight of the epoxy resin. By varying the concentration of either the phenolic accelerator or the organic titanate relative to the chosen resin, the cure rate of the epoxy resin can be altered over a large interval, e.g., from substantially instantaneous gelation to gelation only after heating for approximaely two hours at 160° C. Moreover, variations in cure rate also can be obtained by altering either the chosen epoxy resin, the organic titanate or the phenolic accelerator forming the thermosetting resin. In all cases, however, the phenolic accelerator/titanate hardener will produce a faster cure of the epoxy resin than is obtainable with either the phenolic accelerator or titanate alone.

The epoxy resin employed in the thermosetting resin in this invention can be any epoxy resin having 1,2 epoxy groups and more than one epoxy group per molecule. The epoxy resin thus includes cycloaliphatic epoxy resins, such as 3,4 - epoxycyclohexylmethyl-(3,4-epoxy)cyclohexane carboxylate (sold under the trademarks ERL 4221 by Union Carbide Plastics Company or Araldite CY 179 by Ciba Products Company), bis(3,4 - epoxy - 6 - methyl-cyclohexylmethyl)adipate (sold under the trademarks ERL 4289 by Union Carbide Plastics Company or Araldite CY 178 by Ciba Products Company), vinylcyclohexene dioxide (ERL 4206 made by Union Carbide Plastics Company), bis(2,3-epoxycyclopentyl)ether resins (sold under the trademark ERL 4205 by Union Carbide Plastics Company), 2 - (3,4 - epoxy)cyclohexyl - 5,5-spiro(3,4-epoxy)cyclohexane-m-dioxane (sold under the trademark Araldite CY 175 by Ciba Products Company); glycidyl ethers of polyphenols epoxy resins, such as liquid or solid bisphenol A diglycidyl ether epoxy resins (such as those sold under trademarks as Epon 826, Epon 828, Epon 830, Epon 1001, Epon 1002, Epon 1004, etc. by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company), tetraglycidoxy tetraphenyl-ethane (Epon 1031 made by Shell Chemical Company); glycidyl ester epoxy resins such as diglycidyl phthalate ED–5661 sold by Celanese Resins Company), diglycidyl tetrahydrophthalate (Araldite CY 182 by Ciba Products Company) and diglycidyl hexahydrophthalate (Araldite CY 183 made by Ciba Products Company or ED–5662 made by Celanese Resins Company); and flame retardant epoxy resins such as halogen containing bisphenol A diglycidyl ether epoxy resins (e.g., DER 542 and DER 511 which have bromine contents of 44–48 and 18–20%, respectively, and are made by Dow Chemical Company).

The foregoing epoxy resins are well-known in the art and are set forth, for example, in many patents including U.S. patents Ser. Nos. 2,324,483; 2,444,333; 2,494,295; 2,500,600; and 2,511,913. Moreover, it often is advantageous to employ mixtures of these epoxy resins, e.g., a glycidyl ether epoxy resin such as Epon 828 with a cycloaliphatic epoxy resin such as ERL 4221, to control the cure rate of the thermosetting resin. The hardeners of this invention are not only effective with various epoxy resins and mixtures of epoxy resins, but they are also effective in mixtures containing reactive and non-reactive epoxy diluents (or extenders), epoxy flexibilizers and fillers. Thus, while epoxy resin hardeners of the prior art are effective with only a select group of epoxy resins, the epoxy resins hardeners of this invention (to be more fully explained hereinafter) are effective for cross-linking all groups of epoxy resins.

The hardener for the chosen epoxy resin, or mixtures of resins, generally consists of a mixture of an organic titanate and a phenolic accelerator wherein the phenolic accelerator is present in quantities less than 15% by weight of the epoxy resin. Among the phenolic accelerators which can be effectively used in this invention are bisphenol A (i.e., 2,2-bis(4-hydroxyphenyl)propane), pyrogallol, dihydroxy-diphenyls as well as ortho-, meta-, and para-hydroxybenzaldehydes (such as salicylaldehyde), catechol, resorcinol, hydroquinone, and phenol-formaldehyde and resorcinol-formaldehyde condensates. Examples of other phenolic accelerators suitably employed in this invention also include halogenated phenols such as ortho-, meta-, and para- chlorophenols or bromophenols, and ortho-, meta-, and para-nitrophenols. Desirably, the phenolic accelerator is present in concentrations between 0.1 and 15% by weight of the epoxy resin with optimum cure rates being produced with phenolic accelerator concentrations between 0.5% and 10% by weight of the epoxy resin.

While the phenolic accelerator utilized to form the thermosetting epoxy resin of this invention normally is present in non-stoichiometric quantities, i.e., less than one phenolic hydroxyl group for each epoxy group, the phenolic accelerator may fall into a stoichiometric range when utilized to cure certain solid epoxy resins, e.g., Epon 1002, having a high epoxide equivalent weight. Even when utilized in stoichiometric quantities, however, the hardener probably would still be considered to be a non-stoichiometric hardener based on the mechanism and the speed of the cure. For example, if Epon 1002 is heated with 5 to 15% of catechol, gelatin at 160° C. is not expected to take place even after many hours at 160° C. If gelation does take place, the cured product typically would be an aryl-alkyl ether alcohol in a very weak solid state having substantially no useful properties. Epon 1002 containing 5 to 15% catechol and approximately 5% Tyzor OG gels at 160° C. within minutes and a tough solid would result. The product would be the alkyl-alkyl ether.

In general, the cure rate of the epoxy resin can be altered by varying the weight percentage of phenolic accelerator employed with the epoxy resin or by an alteration in the phenolic accelerator-epoxy resin combination. For example, the cure rate of ERL 4221-titanate-bisphenol A solutions can be significantly increased by substituting a phenol-formaldehyde novolac accelerator for the bisphenol A accelerator. Similarly, by substituting carphenol-formaldehyde novolac in the ERL 4221-titanate-novolac solution with catechol, the rate of cure can again be markedly increased. Within each epoxy-titanate-phenolic combination, the cure rate generally can be increased by increasing the relative phenolic content. By substituting the cycloaliphatic epoxy resin ERL 4221 with a diglycidyl ether epoxy resin such as Epon 828, the cure rate is decreased. Although the cure rate can be varied over a very wide range, the cured resins are tough solids with excellent electrical insulating properties.

The organic titanate added to the epoxy resin to assist the phenolic accelerator in controllably hardening the epoxy resin preferably is a chelated titanate such as acetylacetonate titanate, lactate titanate, triethanolamine titanate, polyhydroxystearate titanate, a glycolate titanate (e.g., tetraoctylene glycol titanate containing approximately 7.8% Ti and sold under the trademark Tyzor OG by E. I. du Pont de Nemours and Co. or di-n-butyl hexylene glycol titanate), or a chelate stabilized with a nitrogen containing polymer (e.g., Tyzor WR sold by E. I. du Pont de Nemours & Co.). By use of chelated titanates, the thermosetting resin can be employed in areas having a substantial water content in the ambient atmosphere. When the thermosetting resin is applied in an atmosphere having substantially zero humidity, non-chelated titanates such as tetraisopropyl titanate, tetrabutyl titanate, polymerized tetrabutyl titanate, and tetrakis (2-ethylhexyl) titanate also can be employed for the epoxy resin hardener. Chelated titanates, such as acetylacetonate titanate, tetraoctylene glycol titanate and di-n-butyl hexylene glycol titanate, however, are preferred for the epoxy resin hardener to provide a homogeneous mixture while exhibiting resistance to hydrolyzation under humid conditions. In general, the chosen titanate should be present in the mixture in a concentration between 0.05 and 10% by weight of the epoxy resin with optimum cure rates generally being obtained utilizing titanate concentrations between 0.2% and 5% by weight of the epoxy resin.

The foregoing organic titanates suitable for use in the thermosetting epoxy resin of this invention are characterized by four (4) Ti—O primary valence bonds. Because titanium has a valence of four and a coordination number of six, these organic titanates also can have four Ti—O primary valence bonds, and one or two secondary valence bonds or chelate bonds. Similar results, however, also should be obtained with organic titanates having only Ti—S primary valence bonds or with organic titanates having four primary valence bonds made up of mixtures of Ti—S and Ti—O bonds. The titanate also should be substantially free of labile ionic species to produce a low dissipation factor in the cured resin.

The resin, phenolic accelerator and titanate chosen for the thermosetting resin can be mixed in any conventional fashion. A liquid phenolic can be dissolved in the epoxy resin or in the titanate either at room temperature or at elevated temperatures. A solid phenolic accelerator in powdered form also can be dissolved in the epoxy resin at room temperature by continuous agitation prior to mixing with the chosen titanate or a liquid concentrate can be formed by dissolving the powdered phenol in part of the epoxy resin at temperatures between 150° and 160° C. whereafter the liquid solution is mixed with the remainder of the epoxy resin. Alternately, the solid phenolic accelerator can be dissolved in the titanate at temperatures of 100–160° C. whereupon the phenolic accelerator/titanate mixture is added to the epoxy resin to effect hardening.

As was previously stated, the rate of cure of the thermosetting resins can be varied by an alteration in the concentration of either the titanate or the phenolic accelerator relative to the resin or by changing the phenolic accelerator/titanate/resin combination, e.g., by substituting a different epoxy resin for part or all of the epoxy resin in the mixture. For example, ERL 4221 (a 3,4-epoxy - cyclohexylmethyl - (3,4-epoxy)cyclohexane carboxylate epoxide resin having an epoxide equivalent weight between 126 and 140) combined with 2% by a weight of a hardener consisting of 66.6% Tyzor OG and 33.3% by weight bisphenol A gels within 50–60 minutes at 160° C. while the gel time of the resin is increased to 75 minutes merely by changing the Tyzor OG-bisphenol A ratio in the hardener to 3:1. When the hardener consists of Tyzor OG and hydroquinone in a 1:1 ratio, a 2% by weight concentration of the hardener mixed with ERL 4221 epoxy resin gels within 35 minutes at 150° C.

The gel time also can be altered by varying the composition of the epoxy resin relative to the hardener. Thus, while a resin containing approximately 100 parts weight ERL 4221 has a gel time of about 55 minutes at 150° C. when combined with a hardener consisting of approximately 3 parts by weight of a 2:1 Tyzor OG/hydroquinone mixture, 100 parts by weight of a 60:40 ERL 4221/Epon 828 mixture has a gel time of 85 minutes at 150° C. utilizing 3 parts by weight of a hardener consisting of Tyzor OG and hydroquinone in a 2:1 ratio. Similarly, 100 parts by weight of a 9:1 solution of ERL 4221 and Epon 828 gels within 60 minutes at 150° C. utilizing approximately 1.5% by weight of a hardener consisting of bisphenol A and Tyzor OG in a 2:1 weight ratio. However, when the epoxy resin is changed to a 7:3 weight ratio of ERL 4221 to Epon 828, the gel time at 150° C. is increased to 65 minutes for an otherwise identical thermosetting resin mixture while 100 parts by weight of the resins in a 1:1 ratio require 80 minutes to gel at 150° C. utilizing the identical phenolic/titanate hardener. In all cases, however, the phenolic accelerator/titanate hardener will produce a faster cure of the epoxy resin than is obtainable with either the phenolic accelerator or titanate alone. This result is unexpected since the addition of small quantities of methylendomethylene-tetrahydrophthalic anhydride to a mixture of a (pentan-2,4-diono) boron difluoride and an epoxy resin formed as the reaction product of (4,4'-dihydroxydiphenyl)dimethyl-methane with epichlorohydrin under alkaline conditions is known to reduce the gel time of the resin.

A more complete understanding of the basic principles of this invention may be obtained from the following specific examples describing various thermosetting epoxy resin formulations.

EXAMPLE 1

100 parts by weight ERL 4221 is mixed with 0.5, 1.0, 2.0, 3.0 and 4.0 parts by weight Tyzor OG and the solutions thus formed are heated at a temperature of 160° C. Gelation is produced in the solutions within a period between 110 minutes and 180 minutes dependent upon the concentration of Tyzor OG in the epoxy resin solution. In general, the rapid cure rates (e.g., gel times between 110 in 150 minutes) are produced in the solutions containing 0.5 or 1.0 part by weight Tyzor OG, while an increase in the Tyzor OG concentration to 4.0 parts by weight requires a bake period of 180 minutes to effect gelation. The fact that gelation occurs in the ERL 4221 by the addition of small amounts of Tyzor OG is unexpected in view of the fact that mixtures formed by the addition of 2.0 parts by weight Tyzor OG to 100 parts by weight of such epoxy resins as Epon 828, DEN 431, DEN 438, ERL 4205, ERL 4289 fail to gel even after 420 minutes at 160° C. while Araldite CY 175, Araldite CY 182, and Araldite CY 183 fail to gel in less than 180 minutes when baked at 160° C.

A significant increase in the gel rate however is obtained when bisphenol A is added to the Tyzor OG. More specifically, when one part by weight bisphenol A is dissolved in 100 parts by weight ERL 4221 by constant agitation at room temperature and subsequently mixed with Tyzor OG in a 100:1 weight ratio, the gel time for the mixture at 160° C. is reduced to 40 minutes as opposed to a gel time in excess of 100 minutes at the same baking temperature for an identical resin/titanate mixture without bisphenol A. Similar results also occur when the Tyzor OG is mixed with the bisphenol A in a 2:1 weight ratio whereafter 2.0 parts by weight of the mixture is added to 100 parts by weight ERL 4221, i.e., gelation is produced upon baking the mixture for 50–60 minutes at 160 C. A variation of the Tyzor OG/bisphenol A ratio of 3:1 effects an increase in the 160° C. bake period required for gelation to 75 minutes utilizing an identical weight ratio, i.e., 100:2, of ERL 4221 epoxy resin to Tyzor OG/bisphenol A hardener. Notwithstanding the weight ratios employed for the titanate/phenolic accelerator hardener, the hardener normally produces a synergistically faster cure rate in the epoxy resin than is obtainable with either the phenol accelerator or titanate alone.

The period required for ERL 4221 to gel at 160° C. also can be altered by the addition of water to the thermosetting resin mixture. Thus, a 100/3/2 parts by weight thermosetting resin mixture of ERL 4221-bisphenol A in a 2:1 weight ratio and Tyzor OG gels within 45–60 minutes when baked at 160° C. while a gel time of 70 minutes is obtained when 1.0 parts by weight water is added to the thermosetting resin mixture. Increasing the water concentration within the mixture to 2.0 parts by weight of the mixture increases the gel time to 80 minutes utilizing an identical baking temperature of 160° C. The water did not destroy the effectiveness of the thermosetting resin as an electrical insulator, nor did the water hydrolyze or destroy the hardner even after the ERL–4221-Tyzor OG-bisphenol A-water solutions were aged several weeks at room temperature.

The excellent pot life stability of the thermosetting resin of this invention is exemplified by the fact that mixtures of ERL 3221, bisphenol A and Tyzor OG in a 100/1.0/0.5 weight ratio begins to gel only after about 79 days at room temperature when stored in a glass container. Longer pot lives can be obtained by storing the resin mixture in cans or at reduced temperatures. For example, the same ERL 4221-bisphenol A-Tyzor OG 100/1.0/0.5 mixture was still a liquid after 268 days at 7° C. Similarly, a resin mixture of ERL 4221, bisphenol A and Tyzor OG in a 100/1.0/2.0 weight ratio begins to gel after 170 days when stored at room temperature in a glass tube while an 18.5 kg. batch of the identical mixture stored in a 5 gallon can does not begin to gel until after standing for 230 days at room temperature. In general, greater quantities of Tyzor OG in the thermosetting resin have been found to increase pot life stability. For example, a resin formed from a 100/2.0/0.5 parts by weight mixture of ERL 4221, bisphenol A and Tyzor OG exhibited a gel time of 28 days at room temperature while a doubling of the Tyzor OG concentration to 1.0 part by weight increased the gel time to 49 days.

EXAMPLE 2

100 parts by weight of an ERL 4221/hydroquinone solution in a 100:1 parts by weight ratio is mixed with one part by weight Tyzor OG to form a thermosetting resin and gelation is produced by baking the resin at 150° C. for 35 minutes. When the Tyzor OG concentration is increased to 2.0 and 3.0 parts by weight, the gel time at 150° C. for the thermosetting resin is increased to 55 and 65 minutes, respectively. Similarly, 100 parts by weight ERL 4221 mixed with 0.5 part by weight of a 1:1 mixture of Tyzor OG and hydroquinone gels within 35 minutes when baked at 150° C. However, increases in the concentration of the Tyzor OG/hydroquinone mixture to between 1.0 and 3.0 parts by weight of the mixture per 100 parts by weight ERL 4221 does not greatly alter the gel period utilizing a baking temperature of 150° C.

EXAMPLE 3

The thermosetting epoxy was prepared by mixing 60 parts by weight ERL 4221, 40 parts by weight Epon 828, 2.0 parts by weight Tyzor OG and 1.0 part by weight hydroquinone. The epoxy then is baked at 150° C. for approximately 85 minutes to produce gelation.

EXAMPLE 4

100 parts by weight ERL 4221 is mixed with 0.5 part by weight Tyzor OG and 0.5 part by weight of salicylaldehyde. The solution gels within 20 minutes when baked at 150° C. When the concentration of both the salicylaldehyde and Tyzor OG increased to 1.0 part by weight per 100 parts by weight ERL 4221, the gel time for the mixture at 150° C. is reduced to 15 minutes while an increase in gel time to 30 minutes is achieved utilizing salicylaldehyde and Tyzor OG concentrations of 0.5 and 3.0 parts by weight, respectively, per 100 parts by weight ERL 4221.

Thermosetting resins containing salicylaldehyde have been found not to follow the general rule of shorter pot life stability with increasing phenolic content or decreasing titanate content. Thus, while a thermosetting resin consisting of 100 parts by weight ERL 4221, 1.0 part by weight salicylaldehyde and 0.5 part by weight Tyzor OG exhibits a gel time of 110 days when stored in a glass container at room temperature, doubling the Tyzor OG content of the thermosetting resin, i.e., to 1.0 part by weight, reduces the gel time at room temperature of 54 days. Increases in the salicylaldehyde content of the resin also can be utilized to produce an increase in the pot life stability of the resin, e.g., a 100:2.0:0.5 ERL 4221/salicylaldehyde/Tyzor OG solution has a gel time of 146 days at room temperature.

EXAMPLE 5

A thermosetting resin is formed by mixing 100 parts by weight ERL 4221 with 1.0 part by weight of a (3/1) Tyzor OG/resorcinol solution prepared by heating the Tyzor OG-resorcinol mixture at 120° C. until a clear, amber solution is obtained. The resin gels within 30–40 minutes when baked at 160° C. while gel time of 55 days is obtained when the resin is stored in a glass container at room temperature. Increases in the concentration of the Tyzor OG/resorcinol content, i.e., from 1.0 to 5.0 parts by weight, without an alteration in the weight of the ERL 4221 does not significantly affect the gel time of the resin at 160° C. but increases the pot life stability of the resin to 84 days when the resin is stored at room temperature. However, when the Tyzor OG/resorcinol mixture is comprised of equal concentrations of the ingredients, a thermosetting resin formed of 1.0 part by weight of the mixture combined with 100 parts by weight ERL 4221 gels within 20 minutes when heated at 160° C.

EXAMPLE 6

A thermosetting resin is prepared by mixing 90 parts by weight ERL 4221, 10 parts by weight Epon 828, 1.0 part by weight bisphenol A and 0.5 part by weight Tyzor OG. The resin requires 60 minutes baking at 150° C. to produce gelation of the resin. When the ratio of the ERL 4221 to Epon 828 is changed to 70:30 without otherwise altering the composition of the thermosetting resin, the gel time required for the resin when baked at 150° C. is 65 minutes while a gel time of 80 minutes is required for equal concentrations of the epoxy resins utilizing the identical bisphenol A-Tyzor OG hardener.

Increases in the gel time of the thermosetting resin also can be obtained by increasing the concentration of the Tyzor OG. Thus, for example, the 60 minute gel time required for a thermosetting epoxy resin consisting of 80 parts by weight ERL 4221, 20 parts by weight Epon 828, 1.0 part by weight bisphenol A, and 0.5 part by weight Tyzor OG when baked at 150° C. can be increased to 80 minutes merely by increasing the Tyzor OG concentration to 1.0 part by weight without altering the weight concentrations of the other ingredients forming the resin.

EXAMPLE 7

10 parts by weight of a 1:1 mixture of Tyzor OG and resorcinol are mixed with 100 parts by weight Epon 828. The mixture then is baked at 160° C. for 120 minutes to produce a soft gel. When the Tyzor OG-resorcinol hardener is formed by a 1:2 weight ratio of the ingredients, a thermosetting resin consisting of 10 parts by weight of the hardener combined with 100 parts by weight Epon 828 gels within 60–120 minutes when heated at 160° C. to produce a firm gel.

EXAMPLE 8

A thermosetting resin is formed by mixing 80 parts by weight Epon 828, 20 parts by weight Epi Rez 5014 (a p-tertiary butyl phenyl glycidyl ether having an epoxide equivalent weight of 225 sold by Celanese Plastics Co.), and 10 parts by weight of a 1:1 mixture of Tyzor OG and resorcinol. Gelation is produced in the resin by baking the resin for 150 minutes at 160° C. Accelerated hardening of the Epon 828-Epi Rez 5014 mixture can be effected by increasing the concentration of hardeners utilized with the resin mixture. For example, while 10 parts by weight of a 1:1 mixture of Tyzor OG and resorcinol produces gelation in an epoxy resin mixture consisting of 80 parts by weight Epon 828 and 20 parts by weight Epi Rez 5014 when baked at 160° C. for 150 minutes, an increase in the Tyzor OG-resorcinol concentration to 15 parts by weight reduces the gel time to between 60 and 120 minutes for otherwise identical conditions.

Although relatively larger concentrations of the Tyzor OG-resorcinol hardener are required to crosslink glycidyl ether epoxy resins (such as Epon 828) relative to the concentration of hardener required to crosslink cycloaliphatic epoxy resins (such as ARL 4221), the low viscosity and long pot life stability of the glycidyl ether epoxy resins make these resins particularly useful for insulating fiber coated conductors utilizing conventional vacuum pressure impregnation techniques. Resins formed by a mixture of 80 parts by weight Epon 828, 20 parts by weight Epi Rez 5014 and 10 parts by weight of a 1:1 mixture of Tyzor OG and resorcinol exhibit a viscosity increase from approximately 20 Stokes to only approximately 32 stokes after 47 days at room temperature in a glass container. Increasing the Tyzor OG-resorcinol hardener concentration to 15 parts by weight of the resin effects an increase in the viscosity of the mixture to approximately 55 stokes after 47 days at room temperature in a glass container.

EXAMPLE 9

A thermosetting resin is prepared by mixing 1 part by weight of BRPA 5570 (i.e., a solid phenol-formaldehyde novolac containing 5 to 6 phenolic-OH groups per molecule sold by Union Carbide Plastics Co.) with 100 parts by weight ERL 4221 whereupon 100 parts by weight of the mixture is combined with 1 parts by weight Tyzor OG. The resin gels within 10 minutes when baked at 150° C. When the Tyzor OG concentration is reduced to 0.5 part by weight of the resin, the gel time decreases to 5 minutes while an increase in the Tyzor OG concentration to 3.0 parts by weight of the resin increases the gel time to 20 minutes when the resin is baked at 150° C.

EXAMPLE 10

A thermosetting epoxy resin is formed by mixing 50 parts by weight ERL 4221, 50 parts by weight Epon 828, and 1.5 parts by weight of an 80:20 mixture of Tyzor OG and BRPA 5570. Gelation occurs upon baking of the resin for 70 minutes at 150° C. When ERL 4221 is substituted completely for the Epon 828 of the resin, i.e., utilizing 100 parts by weight ERL 4221 with 1.5 parts by weight of the 80:20 mixture of Tyzor OG and BRPA 5570, gelation occurs within 30 minutes when the resin is baked at 150° C. In general, phenol-formaldehyde novolacs greatly increase the gelation speed of epoxy organic titanate mixtures.

EXAMPLE 11

A thermosetting epoxy resin mixture is formed by combining 100 parts by weight ERL 4221 with 1.0 part by weight of a 90/10 mixture of Tyzor OG and BRZ 7541 (i.e., a phenol-formaldehyde novolac containing 2 to 3 phenolic OH groups per molecule sold by Union Carbide Plastics Co.). When the mixture is subsequently heated at 150° C., gelation is observed after approximately 60 minutes. When a solution containing 100 parts by weight of ERL 4221 and 1.0 part by weight of a 70/30 Tyzor OG-BRZ 7541 mixture is used, the gel time at 150° C. is reduced to between 5 and 10 minutes. Alteration of the mixture to 1.0 part by weight of a 60/40 percent by weight mixture of Tyzor OG/BRZ 7541 with 100 parts by weight ERL 4221 results in gel times from 1–5 minutes upon baking of the mixture at 150° C.

EXAMPLE 12

A thermosetting epoxy resin is formed by combining 95 parts by weight Epon 828 with 5 parts by weight of a 60:40 mixture of Tyzor OG and BRZ 7541. Upon heating the resin at a temperature of 150° C. for 90 minutes, gelation is observed. When the concentration of Tyzor OG/BRZ 7541 hardener is increased to 10 parts by weight hardener per 90 parts by weight Epon 828, the gel time of the resin is reduced to 45 minutes utilizing identical baking conditions. If ERL 4221 is substituted for a portion of the Epon 828, the reactivity increases and shorter gel times are observed, e.g., a thermosetting resin consisting of 95 parts by weight of a 70:30 Epon 828/ERL 4221 solution and 5 parts by weight of a 60:40 mixture of Tyzor OG and BRZ 7541 gels within 20 minutes when baked at 150° C.

EXAMPLE 13

A thermosetting epoxy resin mixture is formed by combining 95 parts by weight ERL 4206 (i.e., a vinylcyclohexene dioxide epoxy resin having an epoxide equivalent weight of 74–78 sold by Union Carbide Plastics Co.) with 5 parts by weight of a 60/40 mixture of Tyzor OG and BRZ 7541. The mixture exotherms and gels upon standing for a few minutes at room temperature. Resins exhibiting a rapid cure rate at room temperature often are desirable when baking of the resin is not possible, e.g., during field servicing of dynamoelectric machines.

EXAMPLE 14

A thermosetting epoxy resin is formed by mixing 80 parts by weight Epon 828, 20 parts by weight Epi Rez 5014, and 12 parts by weight of a 60:40 mixture of Tyzor OG and BRZ 7541. Upon baking the resin for 45 minutes at 150° C., gelation is observed. When 10 parts by weight ERL 4221 is substituted for 10 parts by weight Epon 826 forming the resin, the gel time at 150° C. is reduced to 30 minutes.

EXAMPLE 15

A thermosetting epoxy resin is prepared by mixing 60 parts by weight Epon 826, 40 parts by weight ERL 2258, i.e. a resin containing bis(2,3-epoxycyclopentyl) ether epoxy resin sold by Union Carbide Plastics Company, and 10 parts by weight of a 60/40 mixture of Tyzor OG and BRZ 7541. Gelation is observed after baking the resin for 75 minutes at 150° C. When the hardener employed consists of a 50/50 mixture of Tyzor OG and BRZ 7541, the gel period is reduced to 45 minutes when the otherwise identical thermosetting resin is baked at 150° C. In general, glycidyl ether-bis(2,3-epoxycyclopentyl) ether epoxy resin solutions possess a low viscosity and are highly suitable for vacuum pressure impregnation insulation of electrical conductors. If desired, the reactivity of the resin can be increased by substituting ERL 4221 for some or all of the Epon 826 or ERL 2258 forming the thermosetting resin.

EXAMPLE 16

A thermosetting epoxide resin is formed by mixing 9 parts by weight of ERL 4221 with 1 part by weight of a 75:25 mixture of Tyzor OG and catechol. The resin exotherms and gels within less than 1 minute at room temperature. Even faster gelation occurs when the catechol content is increased, e.g., when 1.0 part by weight of a 66/33 Tyzor OG-catechol solution is mixed with 9.0 parts by weight of ERL 4221, instantaneous gelation occurs.

EXAMPLE 17

100 parts by weight Epon 828 is mixed with 5 parts by weight of a 1:1 mixture of Tyzor OG and catechol. The thermosetting resin gels within 45 minutes at room temperature.

EXAMPLE 18

A thermosetting resin is formed by mixing 100 parts by weight Epon 828 with 15 parts by weight of a 1:1 solution of Tyzor OG and catechol. The resin is painted on a copper electrical conductor and after standing for 24 hours at room temperature, the resin cures to a hard clear tack-free film.

EXAMPLE 19

A thermosetting resin is formed by mixing 100 parts by weight Epon 828 with 5 parts by weight of a 90:10 mixture of Tyzor OG and catechol. Gel time for the resin when baked at 160° C. is in excess of 180 minutes. A solution consisting of 100 parts by weight of Epon 828 and 5 parts by weight of an 85/15 Tyzor OG/catechol mixture requires 60 minutes to gel at 160° C. An otherwise identical resin utilizing 5 parts by weight of an 80/20 Tyzor OG/catechol mixture gels within 30 minutes at 160° C. The gel time at 160° C. is decreased to 10 minutes when the resin solution is made from 100 parts by weight Epon 828 and 5 parts by weight of a 75/25 Tyzor OG/catechol solution. When 100 parts by weight Epon 828 is mixed with 5 parts by weight of a 50:50 mixture of Tyzor OG and catechol, the resin gels within 5 minutes when baked at 160° C. Although the reactivity of the resins varied over a wide range, all the resins cured to hard, clear tough solids after five hours at 160° C. cure.

EXAMPLE 20

A thermosetting epoxy resin is prepared by mixing 90 parts by weight Epon 828, and 10 parts by weight of a 60:40 parts by weight mixture of titanium acetylacetonate and BRZ 7541. Gelation is produced within less than two hours by baking the resin at 150° C.

EXAMPLE 21

A thermosetting epoxy resin is prepared by mixing 100 parts by weight of a 100:1 parts by weight mixture of ERL 4221 and hydroquinone with 1 part by weight di-n-butyl hexylene glycol titanate. The thermosetting resin gels upon baking for less than 90 minutes at 160° C.

EXAMPLE 22

A thermosetting resin is prepared by mixing 90 parts by weight ERL 4221, 10 parts by weight Epon 828, 1.0 part by weight bisphenol A and 0.5 part by weight of the tetrabutyl titanate Tyzor TBT. Gelatin of the resin occurs within less than 30 minutes at 150° C.

EXAMPLE 23

A solution containing 10 parts by weight CY 179, (i.e., a cycloaliphatic epoxy resin having an epoxide equivalent weight of approximately 140 sold by Ciba Products Co.), 1.0 part by weight of bisphenol A and 2.0 parts by weight of Tyzor OG has a gel time of 131 minutes at 160° C. and the solution is stable for at least 4 months at room temperature. A solution containing 100 parts by weight CY 179, 1.0 part by weight of bisphenol A, 2.0 parts by weight of Tyzor OG and, in addition, 1.0 part by weight of para-nitrophenol has a gel time of 32 minutes at 160° C. and the solution gels at room temperature after approximately 12 days.

EXAMPLE 24

A thermosetting resin is prepared by combining 80 parts by weight ERL 4221, 20 parts by weight Epon, 1.0 part by weight bisphenol A and 0.5 part by weight di-n-butyl hexylene glycol titanate. The thermosetting resin gels within less than two hours when baked at 160° C.

EXAMPLE 25

A thermosetting resin is formed by mixing 100 parts by weight ERL 4221 with 2 parts by weight of a 75:25 mixture of tetraisopropyl titanate and bisphenol A. The resin gels within less than 30 minutes when baked at 160° C.

EXAMPLE 26

A mixture containing 100 parts by weight of Epon 828 and 2.0 parts by weight of titanium acetylacetonate did not gel even after 3 hours in a 160° oven. No gelation took place when a mixture of 100 parts by weight of Epon 828 and 2.0 parts by weight of catechol was heated 3 hours at 160° C. However, when a mixture containing 100 parts by weight of Epon 828, 2.0 parts by weight of catechol was placed in a 160° C. oven, the resin gelled to a firm solid after only 7 minutes.

EXAMPLE 27

A mixture of the epoxy novolac DEN 438 (100 parts by weight) and Tyzor OG (4.5 parts by weight) was placed in a 160° C. oven; no gelation occurred even after 4 hours. A mixture of DEN 438 (100 parts by weight) and the phenol-formaldehyde novolac BRZ 7541 (10.5 parts by weight) was placed in a 160° C. oven; no gelation occurred after 4 hours. However, when a mixture containing 100 parts by weight of DEN 438, 4.5 parts by weight of Tyzor OG and 10.5 parts by weight BRZ 7641 was heated at 160° C., gelation occurred after 12 minutes. The latter resin was a hard, tough solid with a heat distortion temperature of 156° C. after 4 hours at 160° C. cure. Heat distortion temperature was determined at 264 p.s.i. on ½" x ½" x 4" (span) samples using ASTM D 648–56 test method.

EXAMPLE 28

A mixture of the bis(3,4-epoxy-6-methylcyclohexylmethyl)adipate resin ERL 4289 (50 parts by weight) and the triethanolamine titanate Tyzor TE (2.0 parts by weight) was placed in a 160° C. oven. No gelation occurred even after 3½ hours. A mixture of ERL 4289 (50 parts by weight) and BRZ 7541 (5.0 parts by weight) was also heated 3½ hours at 160° C., but no gelation took place. When a mixture of ERL 4289 (50 parts by weight), BRZ 7541 (5.0 parts by weight) and Tyzor TE (2.0 parts by weight) was placed in a 160° C. oven, a firm gel resulted after 15 minutes and a tough, clear amber solid resulted after baking 2 hours at 160° C.

EXAMPLE 29

A mixture of 50 parts by weight of the bis(2,3-epoxycyclopentyl)ether resin ERL 4205 and 1.0 part by weight of the tetrabutyl titanate Tyzor TBT did not gel even after heating 3 hours in a 160° C. oven. A mixture of ERL 4205 (50 parts by weight) and catechol (1.0 part by weight) also did not gel after 3 hours heating in a 160° C. oven. However, when a mixture was made from 50 parts by weight of ERL 4205, 1.0 part by weight of catechol and 1.0 part by weight of Tyzor TBT, gelation occurred after only 4 minutes at 160° C. and a hard, tough solid resulted after heating 1 to 2 hours at 160° C.

EAXMPLE 30

A mixture of the diglycidyl phthalate resin ED 5661 (50 parts by weight) and 1.5 parts by weight of the tetrabutyl titanate Tyzor TBT did not gel even after 3 hours at 160° C. Also, a solution of ED 5661 (50 parts by weight) and catechol (1.0 part by weight) did not gel after 3 hours at 160° C. However, when a mixture of ED 5661 (50 parts by weight), catechol (0.5 parts by weight) and Tyzor TBT (1.5 part by weight) was heated at 160° C., gelation took place after 35 minutes. When an otherwise identical mixture was used except that the catechol content was increased to 1.0 part by weight, gelation at 160° C. occurred after only 15 minutes. Tough, useful solids resulted after baking the Ed 5661-catechol-Tyzor TBT resins 2 hours at 160° C.

EXAMPLE 31

When a mixture of the tetrahydrophthalic diglycidyl ester resin CY 182 (50 parts by weight) and the tetraisopropyl titanate Tyzor TPT (1.5 parts by weight) was heated at 160° C., a soft gel resulted after 70 minutes, but the resin was still a soft, weak solid after 2 hours baking at 160° C. However, when a mixture was prepared from 50 parts by weight of CY 182, 1.5 parts by weight Tyzor TPT and 1.0 part by weight catchol, gelation at 160° C. occurred after only 5 minutes and a tough, hard solid resulted after baking 30 to 60 minutes at 160° C.

EXAMPLE 32

A mixture of hexatydrophthalic diglycidyl ester resin CY 183 (50 parts by weight) and the polymerized tetrabutyltitanate Tyzor PB (1.5 parts by weight) was heated at 160° C., but no gelation occurred even after 2 hours. CY 183 (50 parts by weight) and catechol (1.0 part by weight) was heated at 160° C., but no gelation occurred after 2 hours. When a mixture of CY 183, Tyzor PB, and catechol containing 50, 1.5 and 1.0 parts by weight, respectively, was heated at 160° C., gelation occurred after 20 minutes and a hard, tough solid resulted after heating aproximately 2 hours at 160° C.

EXAMPLE 33

A mixture containing the 2-(3,4-epoxy)cyclohexyl-5,5-spiro(3,4-epoxy)-cyclohexane-m-dioxane resin CY 175 (50 parts by weight) and the polyhydroxy stearate titanate Tyzor TLF-2005 (2.0 parts by weight) was heated at 160° C.; gelation started after 35 minutes but the resin was still very soft after 2 hours at 160° C. When a mixture containing 50 parts by weight CY 175 and 2.0 parts by weight of catechol was heated 2 hours at 160° C., no gelation took place. However, a mixture containing 50 parts by weight CY 175, 2.0 parts by weight TLF-2005 and 2.0 parts by weight catechol gelled to a firm solid after only 5 minutes at 160° C.

EXAMPLE 34

A mixture of the flame retardant, bromine containing epoxy resin DER 542 (100 parts by weight) and Tyzor OG (7.5 parts by weight) did not gel even after 4 hours in a 160° C. oven. Similarly, a mixture of DER 542 (100 parts by weight) and the phenol-formaldehyde novolac BRZ 7541 (7.5 parts by weight) also did not gel after 4 hours heating at 160° C. However, when a mixture containing 100, 7.5 and 7.5 parts by weight of DER 542, Tyzor OG and BRZ 7541, respectively, was placed in a 160° C. oven, gelation occurred within 30 minutes.

EXAMPLE 35

A mixture of 100 parts by weight of ERL 4205 and 2.0 parts by weight of tetrastearyl titanate Tyzor TST did not gel even after heating 3 hours in a 160° C. oven. However, when a mixture containing 100, 2.0, and 2.0 parts by weight of ERL 4205, Tyzor TST and catechol, respectively, was placed in a 160° C. oven, gelation occurred within 15 minutes.

EXAMPLE 36

A mixture of 100 parts by weight of the cycloaliphatic epoxy resin CY 175 and 5.0 parts by weight of the chelate titanate Tyzor WR was heated 2 hours at 160° C., but no gelation took place. When a mixture was prepared from 100 parts by weight of CY 175, 5.0 parts by weight of Tyzor WR and 3.0 parts by weight of catechol, gelation at 160° C. occurred within 25 minutes.

From the above examples it is clear that small quantities of an organic titanate plus a phenolic compound or a phenolic resin can be utilized to cross-like diverse epoxy resins. Moreover, the rate of gelation of the resins can be varied over a wide range by alteration of the concentration or composition of the phenol, organic titanate or epoxy resin employed to form the thermosetting resin. The combination of the phenolic accelerator and organic titanate, however, generally will interact with the epoxy resin to produce a synergistically faster cure of the epoxy resin than is obtainable from either the phenolic accelerator or titanate alone. The broad range of viscosities achievable in the thermosetting resins of this invention also permits diverse techniques to be employed for applying the resin to electrical conductors for insulating purposes. Thus, while low viscosity thermosetting resins are especially adapted to conventional vacuum pressure impregnation techniques wherein the conductor is wrapped with a porous tape, such as Mica Mat tape, and the resin is impregnated within the pores of the tape under pressure, high viscosity thermosetting resins can be brushed directly atop a copper or aluminum conductor whereafter the conductor is drawn through an oven to cure the resin.

The resistance of these resins to thermal degradation is exemplified by the fact that a thermosetting resin consisting of 100 parts by weight of a 99:1 mixture of ERL 4221 and bisphenol A combined with 0.5 part by weight Tyzor OG and cured for 4 hours at 150° C. exhibits weight losses of only 0.1448% and 0.2714% with continued baking at 150° C. for a total of 160 and 188 days, respectively. Only samples aged at temperatures of 200° C. and 240° C. showed craze marks on the surface with samples aged at temperatures below 200° C. being free from craze marks. In general, the thermal degradation of the ERL 422/bisphenol A/Tyzor OG resins are considerably less than the thermal degradation of epoxy insulations such as bisphenol A-diglycidyl ether epoxy resins cross-linked with polyamines.

The excellent dissipation factors of the thermosetting resins of this invention illustrating the suitability of the resins for electrical insulation are shown in Table I.

TABLE I

| ERL 4221-BRPA 5570 (1%) | 100 | 100 | 100 | 100 | 100 |
|---|---|---|---|---|---|
| Tyzor OG | 0.5 | 1.0 | 2.0 | 3.0 | 4.0 |

Cure: 4 hrs. at 150° C.

| Temperature, °C. | Tan δ (60 Hz., 10 v.p.m.) | | | | |
|---|---|---|---|---|---|
| 25 | 0.0038 | 0.0038 | 0.0048 | 0.0039 | 0.0042 |
| 155 | 0.0245 | 0.0221 | 0.0178 | 0.0171 | 0.0167 |

| ERL 4221 | 100 | 100 | 100 | 100 | 100 |
|---|---|---|---|---|---|
| Tyzor OG-BRZ 7541 (90/10) | 0.5 | 1.0 | 2.0 | 4.0 | 5.0 |

Cure: 5 hrs. at 150° C.

| Temperature, °C. | Tan δ (60 Hz., 10 v.p.m.) | | | | |
|---|---|---|---|---|---|
| 25 | 0.0095 | 0.0062 | 0.0047 | 0.0049 | 0.0049 |
| 155 | 0.0223 | 0.0204 | 0.0183 | 0.0237 | 0.0205 |

| ERL 4221-hydroquinone (1%) | 100 | 100 | 100 |
|---|---|---|---|
| Tyzor OG | 1.0 | 2.0 | 3.0 |

Cure: 5 hrs. at 150° C.

| Temperature, °C. | Tan δ (60 Hz., 10 v.p.m.) | | |
|---|---|---|---|
| 25 | 0.0036 | 0.0041 | 0.0053 |
| 100 | 0.0118 | 0.0159 | 0.0199 |
| 155 | 0.0167 | 0.0176 | 0.0185 |
| 170 | 0.0168 | 0.0175 | 0.0189 |

| ERL 4221 | 100 | 100 | 100 | 100 |
|---|---|---|---|---|
| Tyzor OG-bisphenol A (66.6/33.3) | 2.0 | 3.0 | 4.0 | 5.0 |

Cure: 5 hrs. at 160° C.

| Temperature, °C. | Tan δ (60 Hz., 10 v.p.m.) | | | |
|---|---|---|---|---|
| 25 | 0.0043 | 0.0042 | 0.0041 | 0.0143 |
| 150 | | 0.0177 | 0.0169 | 0.0169 |
| 170 | 0.0233 | 0.0255 | 0.0218 | 0.0254 |

| ERL 4221 | 90 | 90 | 80 | 80 | 70 | 70 | 70 | 60 |
|---|---|---|---|---|---|---|---|---|
| Epon 828 | 10 | 10 | 20 | 20 | 30 | 30 | 40 | 40 |
| Bisphenol A | 1.0 | 1.0 | 1.0 | 1.0 | 1.0 | 1.0 | 1.0 | 1.0 |
| Tyzor OG | 0.5 | 1.0 | 0.5 | 1.0 | 0.5 | 1.0 | 0.5 | 1.0 |

Cure: 5 hrs. at 150° C.

| Temperature, °C. | Tan δ (60 Hz., 10 v.p.m.) | | | | | | | |
|---|---|---|---|---|---|---|---|---|
| 25 | 0.0043 | 0.0048 | 0.0042 | 0.0052 | 0.0056 | 0.0075 | 0.0094 | 0.0111 |
| 155 | 0.0232 | 0.0273 | 0.0259 | 0.0294 | 0.0336 | 0.0305 | 0.0562 | 0.0393 |

| Epon 828 | 100 | 100 | 100 | 100 | 100 |
|---|---|---|---|---|---|
| Tyzor OG-BRZ 7541 (30/70) | 7.5 | 10.0 | 12.5 | 15.0 | 17.5 |

Cure: 10 hrs. at 150° C.

| Temperature, °C. | Tan δ (60 Hz., 10 v.p.m.) | | | | |
|---|---|---|---|---|---|
| 25 | 0.0018 | 0.0017 | 0.0032 | 0.0037 | 0.0032 |
| 155 | 0.0119 | 0.0167 | 0.0175 | 0.0186 | 0.0167 |
| 170 | 0.0134 | 0.0133 | 0.0132 | 0.0112 | 0.0395 |

| Epon 828 | 100 | 100 | 100 | 100 | 100 |
|---|---|---|---|---|---|
| Tyzor OG-BRZ 7541 (50/50) | 7.5 | 10.0 | 12.5 | 15.0 | 17.5 |

Cure: 10 hrs. at 150° C.

| Temperature, °C. | Tan δ (60 Hz., 10 v.p.m.) | | | | |
|---|---|---|---|---|---|
| 25 | 0.0018 | 0.0016 | 0.0025 | 0.0036 | 0.0033 |
| 155 | 0.0475 | 0.0121 | 0.0137 | 0.0089 | 0.0152 |
| 170 | 0.0417 | 0.0117 | 0.0114 | 0.0125 | 0.023 |

The resins form hard tough solids having excellent electrical insulating properties from 25° C. to at least 170° C. upon curing. The cured resins therefore are shown to be substantially free of ionic species which tend to reduce the effectiveness of insulations at elevated temperatures. The cured resins of many of these compositions also are characterized by high heat distortion temperatures with heat distortion temperatures of approximately 150° C. generally being obtained after baking the resins for approximately 4 hours at 150–160° C.

What I claim as new and desire to secure by Letters Patent of the United States is:

1. A thermosetting resin for electrically insulating an electrical conductor, said resin consisting essentially of a mixture of an epoxy resin containing 1,2 epoxy groups and having more than one epoxide group per molecule, a phenolic accelerator in quantities between 0.1% and 15% by weight of said epoxy resin and an organic titanate in quantities between 0.05% and 10% by weight of said epoxy resin, said organic titanate having only titanium to oxygen primary valence bonds and being substantially free of labile ionic species to produce a resin having a low dissipation factor upon curing, wherein said organic titanate is selected from the group consisting tetraisopropyl titanate, tetra-n-butyl titanate, polymerized tetrabutyl titanate, tetrastearyl titanate, tetrakis(2-ethyl-1,3-hexanediol) titanate (also known as tetraoctylene glycol titanate or triethanolamine titanate polyhydroxy stearate titanate, di-n-butyl hexylene glycol titanate, said phenolic accelerator and said organic titanate interacting with said epoxy resin to produce a synergistically faster cure of the epoxy resin than is obtainable with either said phenolic accelerator or titanate alone.

2. A thermosetting resin according to claim 1 wherein said titanate is a chelated titanate.

3. A thermosetting resin according to claim 2 wherein said chelated titanate is selected from the group consisting of lactate titanate, triethanolamine titanate, polyhydroxy stearate titanate, glycol titanates and chelate titanates stabilized with nitrogen containing polymer.

4. A thermosetting resin according to claim 3 wherein said selected titanate is present in quantities between 0.2 and 10% by weight of said epoxy resin and said epoxy resin is selected from the group consisting of liquid or solid diglycidyl ether of bisphenol A resins, a polyglycidyl ether of a phenol-formaldehyde novolac, diglycidyl hexahydrophthalate, diglycidyl tetrahydrophthalate, diglycidyl phthalate, vinylcyclohexene dioxide, bis(2,3-epoxycyclopentyl)ether, 3,4- epoxycyclohexylmethyl - (3,4 - epoxy) cyclohexane carboxylate, 3,4 - epoxy-6-methylcyclohexylmethyl-4-epoxy-6-methylcyclohexane carboxylate, 2-(3,4-epoxy)cyclohexyl - 5,5-spiro(3,4-epoxy)cyclohexane-m-dioxane, bis(3,4-epoxy-6-methylcyclohexylmethyl) adipate, and brominated and chlorinated bisphenol A diglycidyl ether epoxy resins.

5. A thermosetting resin according to claim 4 wherein said phenol is selected from the group consisting of phenol-formaldehyde condensates, hydroquinone, catechol, resorcinol, 2,2-bis(4-hydroxyphenyl) propane, resorcinol formaldehyde condensates, ortho-, meta-, and para-hydroxybenzaldehyde, ortho-, meta-, and para-nitrophenol, ortho-, meta-, and para-chlorophenol, and ortho-, meta-, and para-bromophenol.

6. An article of manufacture comprising an elongated conductor, a tape wrapped atop said conductor, said tape being impregnated with the thermosetting resin of claim 1.

7. An article of manufacture comprising an elongated conductor coated with the thermosetting resin of claim 1.

8. A thermosetting resin for electrically insulating an electrical conductor, said resin comprising 3,4-epoxyclclohexylmethyl-(3,4-epoxy)cyclohexane carboxylate epoxide resin, a glycolate titanate selected from a group consisting of tetraoctylene glycol titanate and di-n-butyl hexyl glycol titanate in quantities between 0.05 and 5% by weight of said epoxide resin, and a phenolic compound selected from a group consisting of 2,2-bis(4-hydroxyphenyl) propane, hydroquinone, catechol, phenol-formaldehyde novolacs and salicylaldehyde, said phenolic compound being present in quantities between 0.1 and 15% by weight of said epoxide, said phenol compound and said chosen titanate being present in quantities between 0.1 and 15% by weight of said epoxide resin.

9. A thermosetting resin according to claim 8 wherein said phenolic compound comprises between 0.5% and 5% by weight of said epoxide resin.

10. A thermosetting resin according to claim 9 wherein said epoxide resin is mixed with an epoxide resin selected from the group consisting of a diglycidyl ether of bisphenol A epoxy resin.

11. thermosetting resin according to claim 8 wherein said glycolate titanate is tetraoctylene glycol titanate.

12. An article of manufacture comprising an elongated conductor and a tape wrapped about said conductor, said tape being impregnated with the thermosetting resin of claim 8.

13. A thermosetting epoxy resin for electrically insulating an electrical conductor, said resin comprising a cycloaliphatic epoxy resin containing 1,2 epoxy groups and having more than one epoxide group per molecule, tetraoctylene glycol titanate in quantities between 0.2 and 5% by weight of said epoxy resin and a phenolic accelerator in quantities between 0.5% and 5% by weight of said epoxide resin, said titanate and phenolic accelerator interacting with said epoxy resin to produce a synergistically faster cure of the epoxy resin than is obtainable with either said phenolic accelerator or titanate alone.

14. A thermosetting epoxy resin according to claim 13 wherein said epoxy resin is 3,4-epoxycyclohexylmethyl-(3, 4-epoxy)cyclohexane carboxylate and said phenolic accelerator is selected from the group consisting of phenol formaldehyde condensates, hydroquinone, salicylaldehyde, resorcinol, catechol, and 2,2 - bis(4 - hydroxyphenyl) propane.

15. A thermosetting resin according to claim 13 wherein said accelerator is a phenol-formaldehyde novolac and said epoxy resin is mixed with between 10 and 80% by weight of a glycidyl ether epoxy resin containing 1,2-epoxy groups and having more than one epoxide group per molecule.

16. A thermosetting resin according to claim 15 wherein said glycidyl ether epoxy resin is a resin selected from the group consisting of a glycidyl ether of bisphenol A and a p-tertiary butyl phenyl glycidyl ether and said cycloaliphatic epoxy resin is 3,4-epoxycyclohexylmethyl-(3,4-epoxy)cyclohexane carboxylate).

17. An article of manufacture comprising an elongated conductor and a tape wrapped about said conductor, said tape being impregnated with the thermosetting resin of claim 15.

18. An article of manufacture comprising an elongated conductor electrically insulated with the thermosetting epoxy resin of claim 12.

19. A thermosetting resin for electrically insulating an electrical conductor, said resin comprising a diglycidyl ether of bisphenol A epoxy resin, a glycolate titanate selected from a group consisted of tetraoctylene glycol titanate and di-n-butyl hexylene glycol titanate in quantities between 0.05 and 10% by weight of said epoxy resin, and a phenolic compound selected from a group consisting of 2,2-bis(4-hydroxyphenyl) propane, hydroquinone, resorcinol, catechol, phenol-formaldehyde novolacs and salicylaldehyde, said phenolic compound being present in quantities between 0.1 and 15% by weight of said epoxide resin, said phenolic compound and said chosen titanate interacting with said epoxy resin to produce a synergistically faster cure of the epoxy resin than is obtainable with either said phenolic accelerator or titanate alone.

20. A thermosetting resin according to claim 16 wherein said bisphenol A epoxy resin is a glycidyl ether of bisphenol A, said glycolate titanate is tetraoctylene glycol titanate and said phenolic compound is selected from the group consisting of 2,2-bis(4-hydroxyphenyl) propane, resorcinol and phenol-formaldehyde novolacs.

21. An article of manufacture comprising an elongated conductor and a tape wrapped about said conductor, said tape being impregnated with the thermosetting resin of claim 20.

22. A thermosetting resin for electrically insulating an electrical conductor, said resin comprising an epoxy resin containing 1,2-epoxy groups and having more than one epoxide group per molecule, a phenolic accelerator in quantities between 0.1% and 15% by weight of said epoxy resin and an organic titanate selected from the group consisting of tetraoctylene glycol titanate and di-n-butyl hexylene glycol titanate, said phenolic accelerator and said organic titanate interacting with said epoxy resin to produce a synergistically faster cure of the epoxy than is obtainable with either said phenolic accelerator or ttianate alone.

23. A thermosetting resin for electrically insulating an electrical conductor according to claim 22 wherein said titanate is tetraoctylene glycol titanate.

24. A thermosetting resin for electrically insulating an electrical conductor according to claim 22 wherein said epoxy resin is a 3,4-epoxy-cyclohexylmethyl-(3,4-epoxy) cyclohexane carboxylate epoxide resin.

References Cited
UNITED STATES PATENTS

| | | | |
|---|---|---|---|
| 2,876,208 | 3/1959 | Naps | 260—47 EC |
| 3,298,999 | 1/1967 | Kiriyama | 260—831 |
| 3,312,637 | 4/1967 | Durst | 260—47 EC |
| 3,424,699 | 1/1969 | Stark | 260—834 |
| 3,487,027 | 12/1969 | Case | 260—2 EC |
| 3,551,519 | 12/1970 | Dubsky | 260—836 |
| 3,563,850 | 2/1971 | Stackhouse | 260—47 EC |
| 3,573,255 | 3/1971 | Cyba | 260—47 EC |
| 3,626,022 | 12/1971 | Suzuki | 260—831 |

PAUL LIEBERMAN, Primary Examiner

U.S. Cl. X.R.

260—2 EC, 47 EC; 174—121 SR